US011108283B2

(12) United States Patent
Lubert et al.

(10) Patent No.: US 11,108,283 B2
(45) Date of Patent: Aug. 31, 2021

(54) DEVICE FOR INDUCTIVELY CHARGING AN ELECTRONIC ELEMENT OF THE MOBILE-PHONE TYPE

(71) Applicants: Continental Automotive France, Toulouse (FR); Continental Automotive GmbH, Hannover (DE)

(72) Inventors: Vincent Lubert, Castelnau d'Estretefonds (FR); Frédéric Ducos, Carbone (FR)

(73) Assignees: Continental Automotive France; Continental Automotive GmbH

( * ) Notice: Subject to any disclaimer, the term of this patent is extended or adjusted under 35 U.S.C. 154(b) by 337 days.

(21) Appl. No.: 16/341,129

(22) PCT Filed: Nov. 24, 2017

(86) PCT No.: PCT/FR2017/053247
§ 371 (c)(1),
(2) Date: Apr. 11, 2019

(87) PCT Pub. No.: WO2018/096291
PCT Pub. Date: May 31, 2018

(65) Prior Publication Data
US 2020/0185978 A1 Jun. 11, 2020

(30) Foreign Application Priority Data
Nov. 25, 2016 (FR) ...................................... 1661535

(51) Int. Cl.
*H02J 7/00* (2006.01)
*H02J 50/90* (2016.01)
(Continued)

(52) U.S. Cl.
CPC .......... *H02J 50/90* (2016.02); *B60R 11/0241* (2013.01); *B60R 16/03* (2013.01);
(Continued)

(58) Field of Classification Search
None
See application file for complete search history.

(56) References Cited

U.S. PATENT DOCUMENTS

| 8,818,465 B1* | 8/2014 | Gorham, Jr. | ......... H04B 1/3888 |
| | | | 455/575.1 |
| 2012/0313576 A1* | 12/2012 | Peiker | ..................... H02J 50/90 |
| | | | 320/108 |

(Continued)

OTHER PUBLICATIONS

International Search Report and Written Opinion for International Application No. PCT/FR2017/053247, dated Feb. 8, 2018—9 pages.
(Continued)

*Primary Examiner* — Arun C Williams
(74) *Attorney, Agent, or Firm* — RatnerPrestia (57) ABSTRACT

A device for the inductive recharging of an electronic element of the mobile-phone or digital tablet type having at least one receiving antenna. The device having an exterior face intended to support the electronic element, a stage of planar shape being able to move inside the device and bearing at least one emitting antenna intended to be aligned with, and in close proximity to, the at least one receiving antenna, the mobile stage being actuated by a motorized actuating mechanism. The actuating mechanism includes a single motor coupled to a main drive element that renders the stage mobile in a plane parallel to the exterior face of the device, the main drive element being circular in shape, and the motor meshing with a periphery of the main drive element and driving the main drive element in rotation.

10 Claims, 7 Drawing Sheets

(51) Int. Cl.
*H02J 50/10* (2016.01)
*H02J 50/00* (2016.01)
*H02J 50/40* (2016.01)
*B60R 11/02* (2006.01)
*B60R 16/03* (2006.01)

(52) U.S. Cl.
CPC ............ *H02J 50/005* (2020.01); *H02J 50/10* (2016.02); *H02J 50/402* (2020.01)

(56) References Cited

U.S. PATENT DOCUMENTS

| 2012/0326659 | A1  | 12/2012 | Shukuya    |            |
|--------------|-----|---------|------------|------------|
| 2013/0244735 | A1* | 9/2013  | Bury       | H02J 50/90 |
|              |     |         |            | 455/573    |
| 2016/0118861 | A1* | 4/2016  | Gabriel    | H02J 7/32  |
|              |     |         |            | 320/114    |
| 2016/0126778 | A1  | 5/2016  | Kanahara et al. | |
| 2018/0245365 | A1* | 8/2018  | Wankewycz  | H02J 7/0042 |

OTHER PUBLICATIONS

English Translation of Written Opinion for International Application No. PCT/FR2017/053247, dated Feb. 8, 2018, 7 pages.

\* cited by examiner

DEVICE FOR INDUCTIVELY CHARGING AN ELECTRONIC ELEMENT OF THE MOBILE-PHONE TYPE

CROSS REFERENCE TO RELATED APPLICATIONS

This application is the U.S. National Phase Application of PCT International Application No. PCT/EP2017/053247, filed Nov. 24, 2017, which claims priority to French Patent Application No. 1661535, filed Nov. 25, 2016, the contents of such applications being incorporated by reference herein.

FIELD OF THE INVENTION

The present invention relates to a device for the inductive recharging of an electronic element of the mobile-phone or digital tablet type having at least one receiving antenna. The device has an exterior face intended to support the electronic element for the recharging of same. A stage of planar shape is able to move inside the device while bearing at least one emitting antenna intended to be aligned with, and in close proximity to, said at least one receiving antenna, the mobile stage being actuated by a motorized actuating mechanism.

Such an inductive charging device can be carried on board a motor vehicle, although this is nonlimiting.

BACKGROUND OF THE INVENTION

In the case of devices for inductively recharging an electronic element, it is necessary for the emitting antenna(s) to be correctly positioned with respect to the receiving antenna(s) so as to allow efficient recharging by induction. Deviations, even small deviations, from the optimal position may lead to low recharging efficiency.

In order to give an idea of scale, in the case of a mobile phone, a charging zone of an emitting antenna measures 20×20 mm in the recharging device. The charging zone in the electronic element that is to be charged is smaller, of around 10×10 mm$^2$. In the case of an inductive-recharging device, the zone on which the phone is set down may be comprised approximately between 140×80 mm and 200× 100 mm and the telephone dimensions may be comprised between 110×70 mm and 175×85 mm.

Given the dimensions, respectively, of each of the elements, namely the zone on which the phone is positioned, the dimensions of the phone, the active zone of the emitting antenna of the recharging device, the active zone of the receiving antenna of the phone, in order to allow the phone to be charged in all scenarios it is necessary either to multiply the number of antennas in the recharging device or to move this antenna so that it allows the phone to be charged.

It has therefore been proposed to provide adjustment of the emitting antenna(s) with respect to the receiving antenna (s) in order to correct any possible deviation in positioning of the electronic element that is to be recharged, the latter having not been correctly positioned by the user or having deviated from its starting position. This is particularly true of a motor vehicle in which the mobile phone is liable to be poorly positioned or to move.

It is thus known practice to use electric motors, advantageously two electric motors, to correct the position of the stage carrying the emitting antenna(s) in the recharging device.

Using two electric motors does, however, considerably increase the price of the recharging device and increases its bulk, given that each motor has its own control electronics, which are therefore duplicated.

As an alternate solution, provision has also been made for the number of emitting antennas to be multiplied, something which is likewise a costly and complex solution.

SUMMARY OF THE INVENTION

The problem addressed by an aspect of the present invention is that of designing a device for the inductive recharging of an electronic element, that allows the positioning of the emitting antenna(s) in the recharging device to be adapted relative to the receiving antenna(s) of the electronic element, this adaptation needing to be simple and inexpensive while being as efficient as possible.

To this end, an aspect of the present invention relates to a device for the inductive recharging of an electronic element of the mobile-phone or digital tablet type having at least one receiving antenna, the device having an exterior face intended to support the electronic element for the recharging of same, a stage of planar shape being able to move inside the device and bearing at least one emitting antenna intended to be aligned with, and in close proximity to, said at least one receiving antenna, the mobile stage being actuated by a motorized actuating mechanism, which is notable in that the actuating mechanism comprises a single motor coupled to a main drive element that renders the stage mobile in a plane parallel to the exterior face of the device, the main drive element being circular in shape, and the motor meshing with a periphery of the main drive element and driving the main drive element in rotation.

The technical effect obtained is that of using a single motor which is able to perform adjustment of two-components. It is also possible to use a single antenna whereas the prior art uses two motors or several antennas. There is therefore a cost saving, yet also simplicity in the adjusting of the position of the stage.

Multiplying the number of motors and antennas would entail the use of a whole raft of control electronics that an aspect of the present invention makes it possible to omit.

Advantageously, the actuating mechanism comprises at least one guide finger pointing toward the stage, said at least one guide finger entering a groove made on one face of the stage facing the actuating mechanism and the motor has reduction gearing and an output shaft meshing with the periphery of the main drive element, the output shaft and the main drive element extending in a plane parallel to the plane of the stage.

Compared to a motor that has an output shaft perpendicular to the stage, the output shaft of the motor can be parallel to the plane of the stage, thereby rendering the recharging device more compact.

According to a first embodiment of the invention, in the actuating mechanism, the main drive element is secured to a pulley by way of driving pulley, arranged coaxially with respect to the main drive element and driven in rotation by the motor via the main drive element, a belt being wrapped around the driving pulley and around at least one driven return pulley, the belt bearing said at least one guide finger.

This embodiment is relatively economical and can be adapted according to the path imposed on the belt. The tensioning roller(s) ensure(s) adjustable belt tension and may possibly make it possible to alter the path of the belt locally, hence making it easier to adapt to suit various types of electronic element receiving faces.

According to a second embodiment of the invention, the main drive element is a primary meshing element driving two secondary meshing elements positioned diametrically opposite each other with respect to the center of the primary meshing element, said at least one guide finger passing through each secondary meshing element in the direction of the stage, said at least one guide finger being mobile toward and away from the stage by action of a cam profile borne by one face of the primary meshing element oriented toward the stage.

This embodiment is the more complex embodiment, but also the more accurate. The fingers are partially retractable by becoming inserted into a guideway formed by a respective groove. The stage may alternately be driven on one or more secondary meshing elements which are themselves driven by the primary meshing element.

Advantageously, said at least one guide finger is elastically returned away from the stage by a return element, the groove forming a guideway for said at least one finger. This means that a finger can be withdrawn automatically from the groove when the finger is no longer exerting a driving action on the stage, the cam profile then being reduced.

Advantageously, the actuating system comprises two guide fingers per secondary meshing element, each secondary meshing element having a first drive pinion meshing with the periphery of the primary meshing element, and a second pinion facing toward the stage, the first drive pinion and the second pinion being coaxial and secured by a connecting shaft, the first drive pinion, the second pinion, the primary meshing element and the stage extending in respective parallel planes.

Advantageously, each second pinion is larger in diameter than the first drive pinion with which it is associated, the second pinion overlapping from a distance a portion of the primary meshing element, the second pinion having passing through it two bores for the passage of a respective guide finger, the two bores together subtending a circular arc of less than 45°.

According to a third embodiment of the invention, the main element is a driving eccentric wheel, the actuating mechanism also comprising a guide finger and an auxiliary eccentric wheel not directly driven by the motor, the actuating mechanism being configured in such a way that the movement of the stage is a combination of a translational movement and of a rotational movement. This combined translational and rotational movement of the stage allows a larger charging area to be covered.

Advantageously, the device comprises a fixed support supporting the axle of each of the two eccentric wheels and to which support the guide finger is secured by one end, the guide finger being housed in a guide zone with a closed circular edge to limit its travel.

Advantageously, said at least one emitting antenna is in the form of a flat coil resting against a face of the stage that is intended to face said at least one receiving antenna of the electronic element that is to be recharged.

An aspect of the present invention also relates to a motor vehicle that is notable in that it incorporates such an induction-recharging device. In a motor vehicle that is in operation, an electronic element of the mobile-phone style may be poorly positioned or may move when placed on the induction-recharging device. An aspect of the present invention, notably via its three embodiments detailed hereinabove, allows these variations in position of the electronic element on the device to be corrected.

BRIEF DESCRIPTION OF THE DRAWINGS

Other features, aspects and advantages of the present invention will become apparent upon reading the detailed description that will follow and upon examining the appended drawings, given by way of nonlimiting example and in which:

FIGS. 9A-9I illustrate, viewed from above, various successive steps of the dynamics of the inductive-recharging device illustrated in FIG. 8.

DETAILED DESCRIPTION OF THE PREFERRED EMBODIMENTS

In what follows, reference will be made to all the figures considered in combination, and when a numerical reference is missing from any given figure this numerical reference will be found in the other figures.

Figure 11:
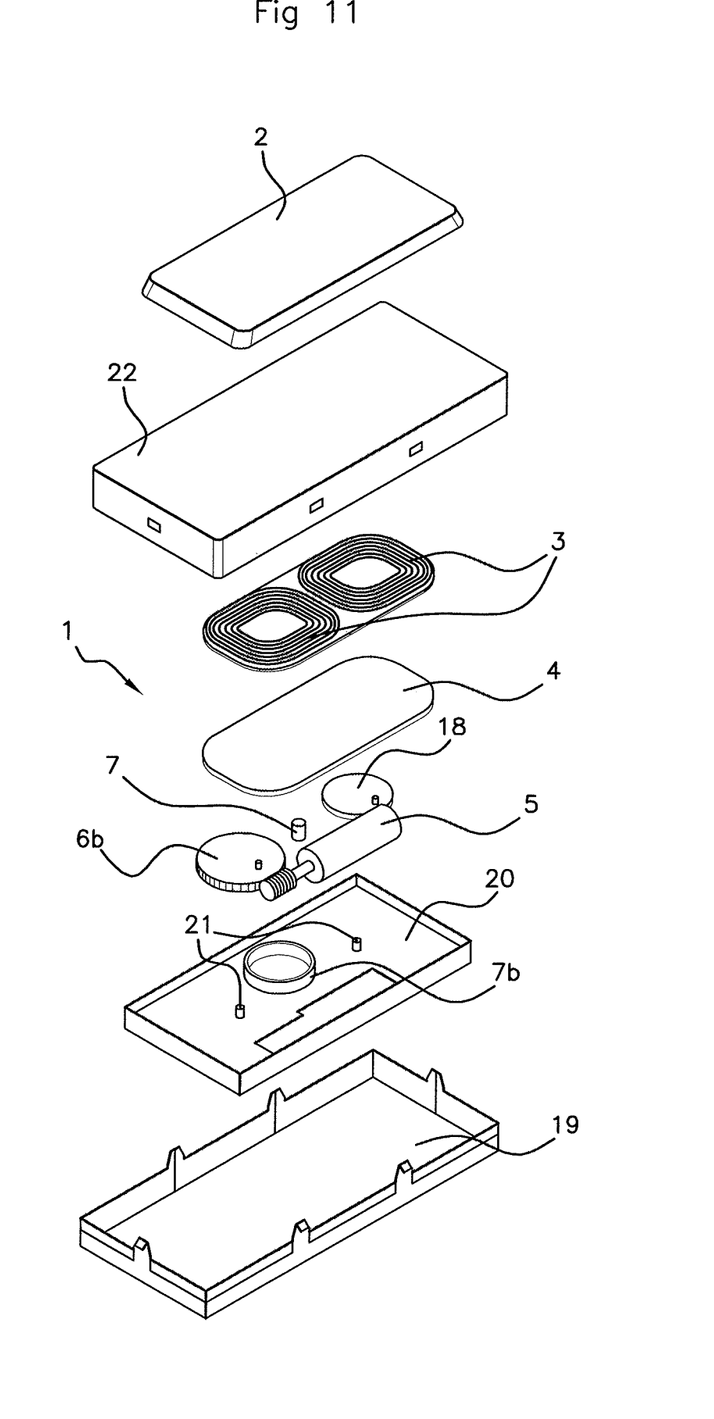
FIG. 11 is a schematic depiction of an exploded view of the inductive-recharging device according to the third embodiment illustrated in FIG. 8.

With reference to all the figures, in all its embodiments, an aspect of the present invention relates to a device 1 for the inductive recharging of an electronic element 2, visible in FIG. 11, of the mobile-phone or digital tablet type, having at least one receiving antenna. The recharging device 1 has an exterior face intended for supporting the electronic element 2 while it is recharging.

A stage 4 of planar shape is able to move inside the device 1 and bears at least one emitting antenna 3 intended to be aligned with, and in close proximity to, said at least one receiving antenna. The mobile stage 4 is actuated by a motorized actuating mechanism.

According to an aspect of the invention, the actuating mechanism comprises a single motor 5 coupled to a main drive element 6, 6a, 6b that renders the stage 4 mobile in a plane parallel to the exterior face of the device 1. The main drive element 6, 6a, 6b is of circular shape, and the motor 5 meshes with a periphery of the main drive element 6, 6a, 6b, driving the main drive element 6, 6a, 6b in rotation.

Optionally, in embodiments of the invention, the actuating mechanism comprises at least one guide finger 7 pointing toward the stage 4. Said at least one guide finger 7 enters a groove 8 made on one face of the stage 4 facing the actuating mechanism.

The motor 5, advantageously an electric motor, may have reduction gearing 5a and an output shaft 9 meshing with the periphery of the main drive element 6, 6a, 6b. The output shaft 9 and the main drive element 6, 6a, 6b extend in a plane parallel to the plane of the stage 4.

Three nonlimiting embodiments of the invention will now be detailed.

In a first embodiment, with reference notably to FIGS. 1 to 3A-3G, in the actuating mechanism, the main drive element 6, in direct mesh with the motor 5 at its periphery, is secured to a pulley by way of driving pulley 10.

Figure 2:
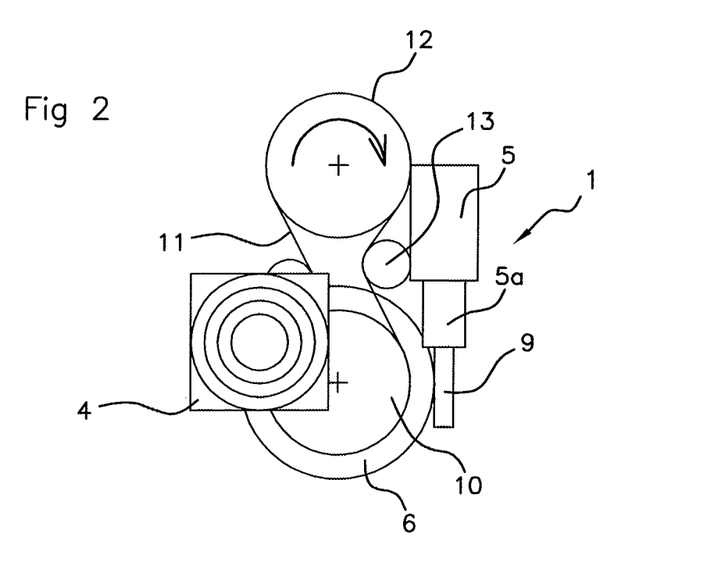
FIG. 2 is a schematic depiction of a view from above of the induction-recharging device according to the first embodiment shown in FIG. 1, FIGS. 3A-3G illustrate, viewed from above, the various successive steps of the dynamics of the inductive-recharging device illustrated in FIGS. 1 and 2.
Figure 3:
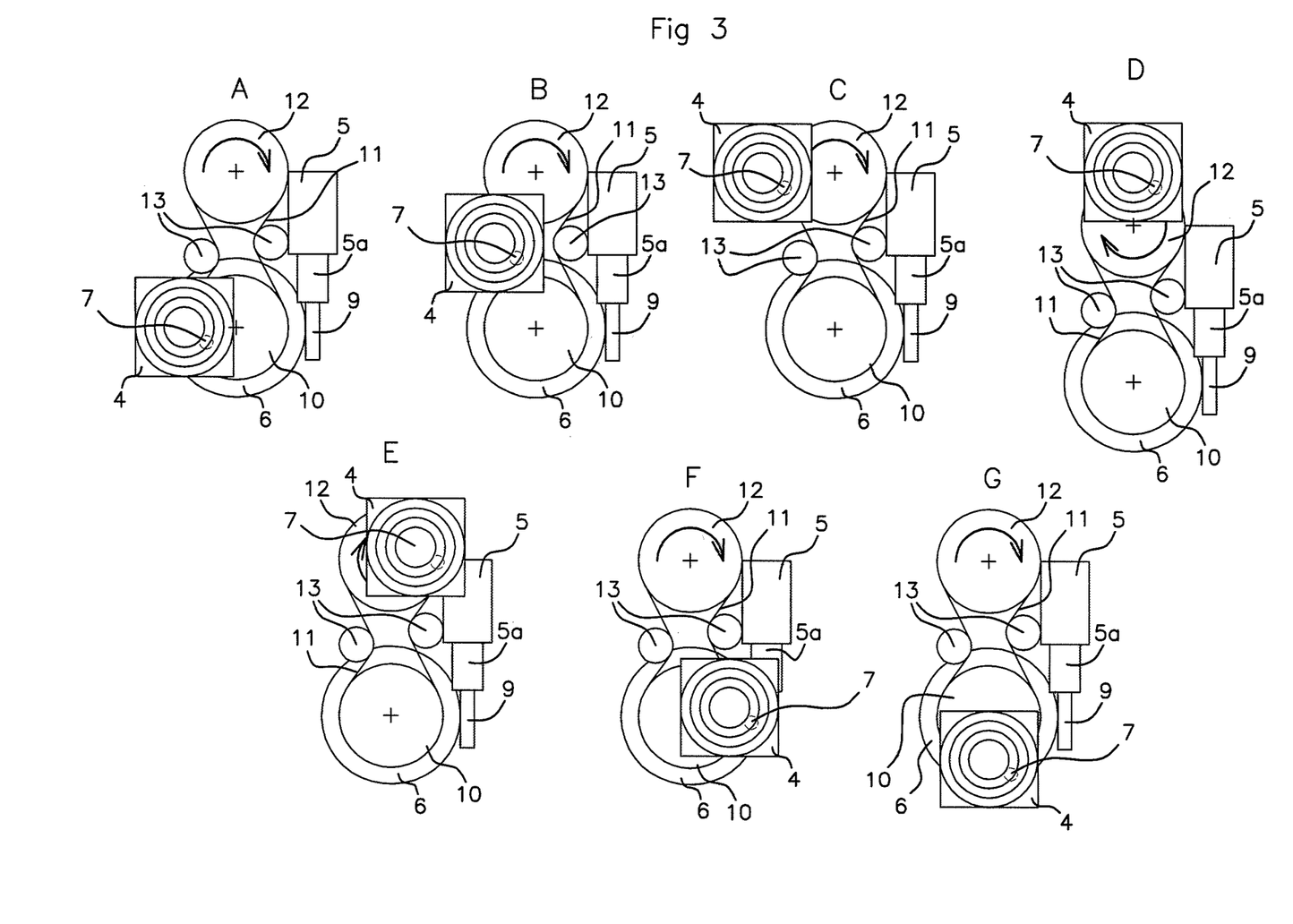

This driving pulley 10 may be positioned coaxially with respect to the main drive element 6 and is driven in rotation by the motor 5 via the main drive element 6. A belt 11 is then wrapped around the driving pulley 10 and around at least one driven return pulley 12. It is this belt 11 that bears said at least one guide finger 7 entering a groove 8 made on a face of the stage 4 facing the actuating mechanism and the drive element 6. FIGS. 1 to 3A-3G show a single guide finger 7.

Figure 1:
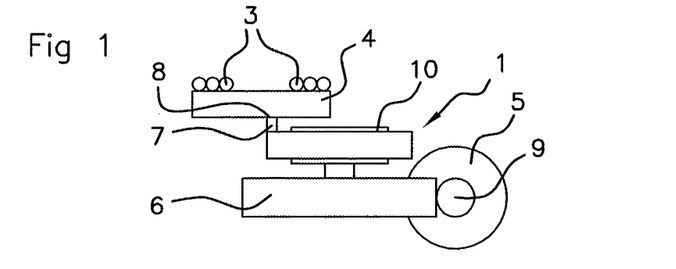
FIG. 1 is a schematic depiction of a view in cross section of an induction-recharging device according to a first embodiment according to the present invention.

In FIG. 1, the guide finger 7 is in the form of an angle bracket. The pulleys 10, 12 drive the belt 11 in rotation. The actuating mechanism may comprise at least one tensioning roller 13 for tensioning the belt 11, advantageously two tensioning rollers. The tensioning the rollers 13 ensure suitable tension in the belt 11 and may possibly make it possible to alter the path of the belt 11 locally.

FIGS. 3A-3G show one form of the dynamics of the movement of the stage 4 initiated by the actuating mechanism in various positions A to G reached by the rotation of the main drive element 6 and of the driving pulley 10 associated therewith.

In a second embodiment of the invention, with reference notably to FIGS. 4 to 7, in the actuating mechanism, the main drive element, in direct mesh with the motor 5 at its periphery, is a primary meshing element 6a driving two secondary meshing elements 14, 15, 16 positioned so that they are diametrically opposite each other with respect to the center of the primary meshing element 6a.

The guide finger(s) 7, of which there are advantageously two per secondary meshing set 14, 15, 16, as shown in FIGS. 4 to 7H, may pass through each secondary meshing element 14, 15, 16 in the direction of the stage 4. The guide finger(s) 7 may be mobile toward and away from the stage 4 through the action of the cam profile 7 borne by one face of the primary meshing element 6a facing toward the stage 4.

Figure 4:
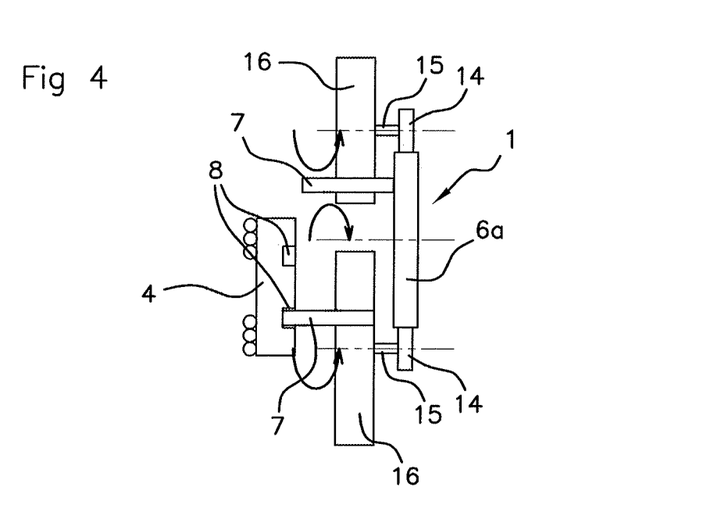
FIG. 4 is a schematic depiction of a view in cross section of an induction-recharging device according to a second embodiment according to the present invention.
Figure 7:
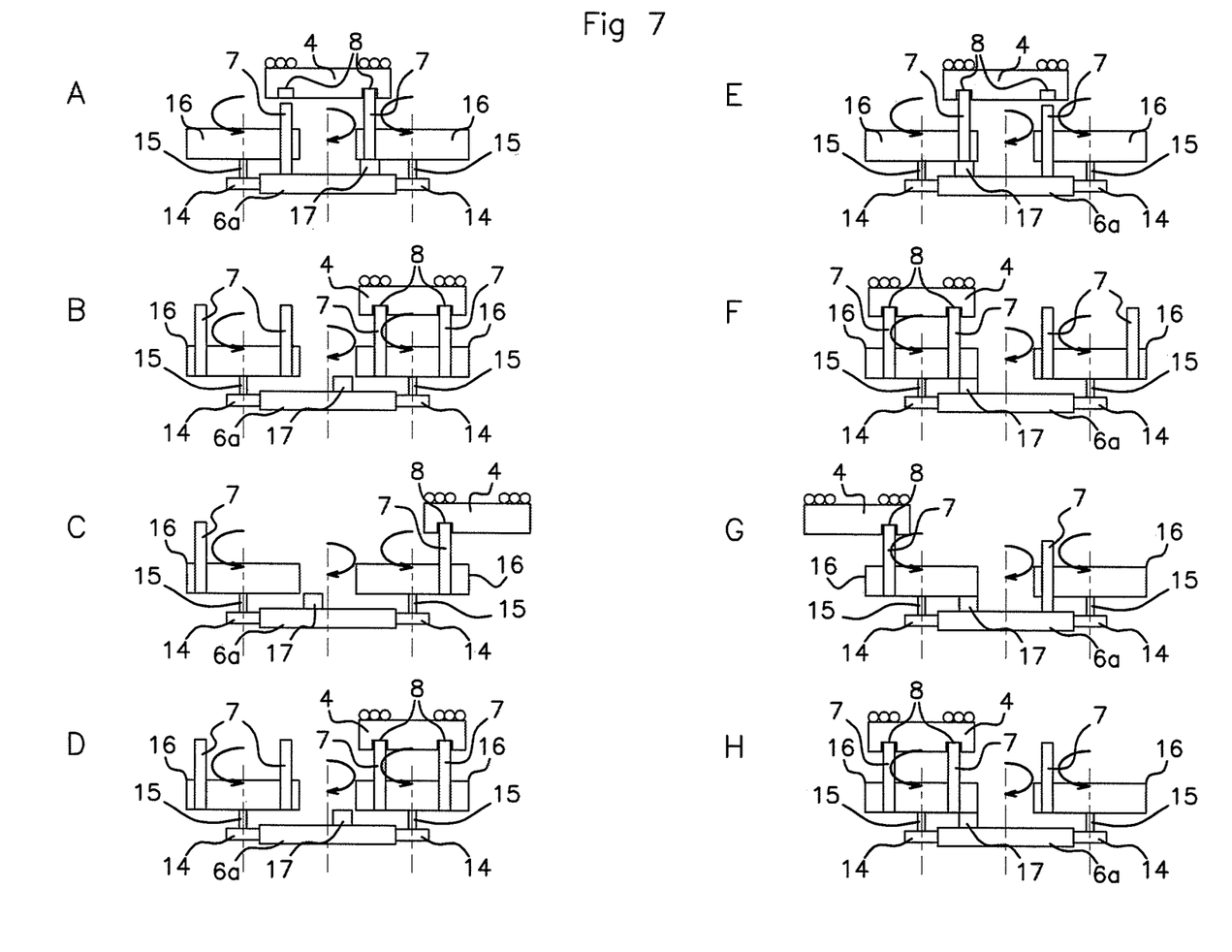

The guide finger(s) 7 may be pushed toward the stage 4 by the cam profile 17 notably visible in FIGS. 4 and 7. The guide finger(s) 7 may point in a manner perpendicular to their associated secondary meshing set 14, 15, 16, and likewise in a manner perpendicular to the primary meshing element 6a.

In addition, the guide finger(s) 7 may be elastically returned away from the stage 4 by a return element. The guide fingers 7 may for example be mounted on one or more spring(s) so that they can retract when not pushed by the cam profile 17 of the primary meshing element 6a. The groove(s) 8 form(s) a guideway for the guide finger(s) 7.

As is particularly clearly visible in FIGS. 7A-7H, the actuating system comprises two guide fingers 7 per secondary meshing element 14, 15, 16. Each secondary meshing element 14, 15, 16 may have a first drive pinion 14 meshing with the periphery of the primary meshing element 6a, and a second pinion 16 facing toward the stage 4.

The first drive pinion 14 and the second pinion 16 may be coaxial and secured to one another by a connecting shaft 15 holding them distanced from one another in superposed planes. The first drive pinion 14, the second pinion 16, the primary meshing element 6a and the stage 4 may then extend in superposed respective parallel planes.

Each second pinion 16 may be larger in diameter than the first drive pinion 14 with which it is associated. In that case, the second pinion 16 overlaps from a distance a portion of the primary meshing element 6a. It is on this portion of the primary meshing element 6a that can be overlapped by the second pinions 16 that the guide finger(s) 7 bear(s), either directly, this being in the retracted position, or via the cam profile 17.

The second pinion 16 may have passing through it two bores 16a for the passage of a respective guide finger 7, the two bores 16a together subtending a circular arc advantageously of less than 45°.

FIGS. 6A-7H show the dynamics of the movement of the stage 4 by the actuating mechanism in various positions A to G which, in the case of these two figures, correspond to one another, one being a view from above, and the other a view in lateral section, of the actuating mechanism, respectively. In these figures, the movement of the stage 4 is deliberately exaggerated to make it more visible.

In a third embodiment of the invention, with reference notably to FIGS. 8 to 11, in the actuating mechanism, the drive element, in direct mesh with the motor 5 at its periphery, is a driving eccentric wheel 6b. The actuating mechanism also comprises a guide finger 7 and an auxiliary eccentric wheel 18 not directly driven by the motor 5. The actuating mechanism is configured in such a way that the movement of the stage 4 is a combination of a translational movement and of a rotational movement.

Figure 8:
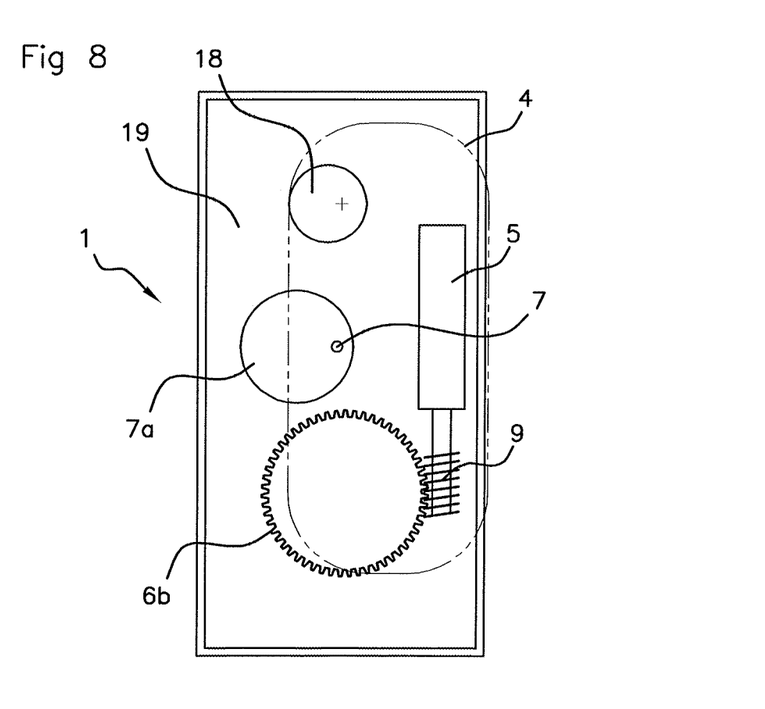
FIG. 8 is a schematic depiction of a view from above of the induction-recharging device according to a third embodiment according to the present invention.
Figure 9:
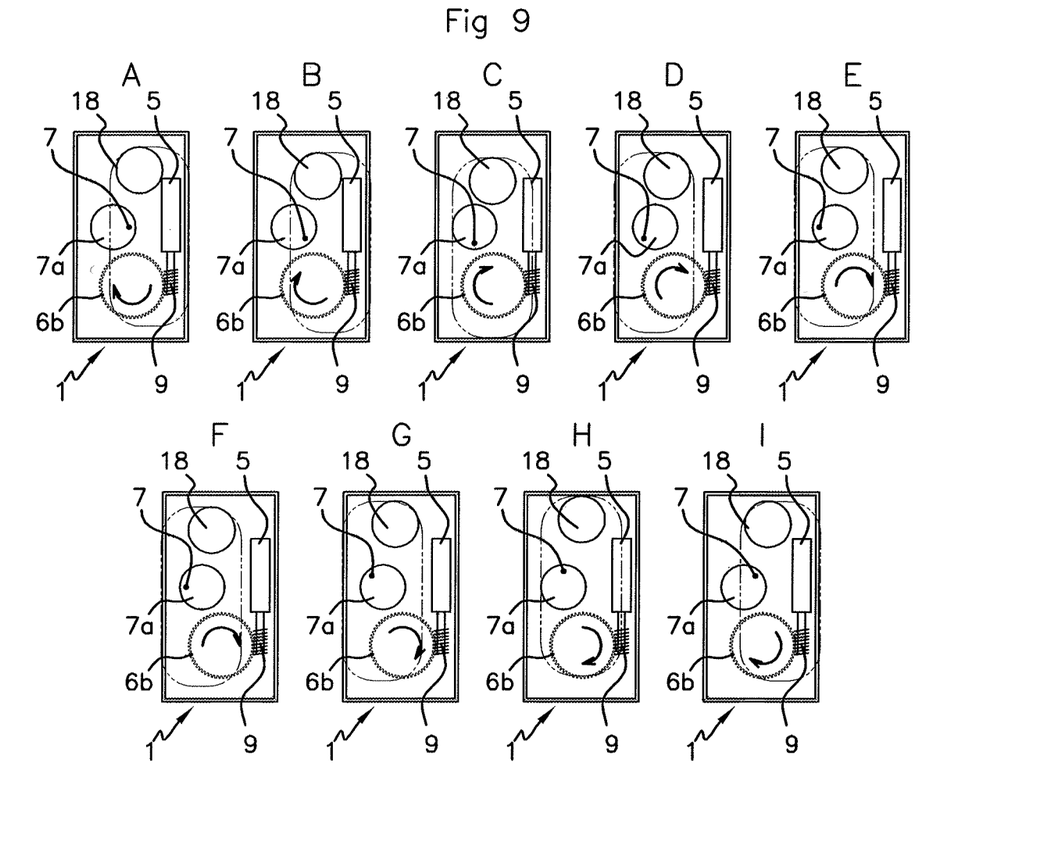

The driving eccentric wheel 6b may be toothed and collaborate with a meshing surface provided on the output shaft 9 of the motor 5. A guide zone 7a, advantageously with a circular closed edge, delimits the path of the guide finger 7. The guide finger 7, which may be of substantially rectilinear shape, may have a first end housed in the groove of the stage 4, and a second end flanked by the guide zone 7a. The movement of the stage 4 is defined by the closed circular edge of the guide zone 7a, against which the second end of the guide finger 7 bears.

FIGS. 9A-9I show one form of the dynamics of this third embodiment according to the present invention, which combines a translational movement with a rotational movement. The start of these dynamics begins with a translational movement between references A and B, followed by a combination of translational and rotational movements in the steps C to I.

In a sub-mode of this third embodiment according to the present invention, instead of a movement in order to find a favored position of the antenna-support stage 4, a continuous movement of the stage 4 may be anticipated.

Figure 10:
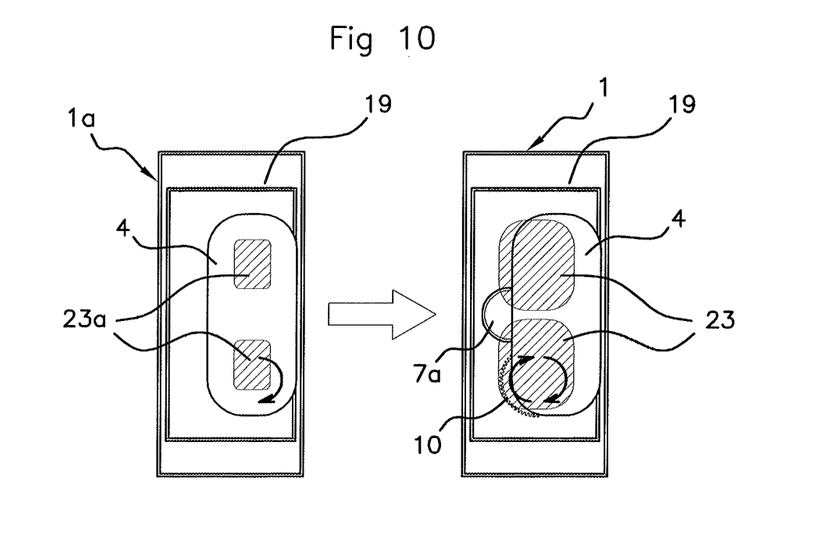
FIG. 10 illustrates a comparison of the charging zone obtained according to a recharging device of the prior art and a recharging device according to the third embodiment of the present invention, illustrated in FIG. 8.

FIG. 10 shows a comparison of the charging zones 23a, 23 for a recharging device of the prior art 1a and a recharging device 1 according to an aspect of the present invention. The charging zone 23 of the recharging device 1 according to the an aspect of present invention may be double the size of the charging zone 23a of the recharging device according to the prior art 1a. This is due to the creation of a movement that combines a translational and a rotational movement of the stage 4, creating a charging zone 23 that is substantially double the size of the charging zone 23a of the prior art.

Depending on the eccentricity values that are possible, the charging coverage zone can therefore be doubled. In the prior art, the same coverage zone with fixed antennas entails duplicating the antennas, which then also necessitates the duplication of all of the electronics needed for controlling same.

FIG. 11 shows an exploded view of the inductive-recharging device 1 according to this third embodiment of the present invention, for an electronic element 2 of the mobile-phone or digital tablet type. The inductive-recharging device 1 may have a bearing surface on which the electronic element 2 is charged. This bearing surface is advantageously formed by an upper face of an upper casing 22.

Advantageously, the assembly is a motor vehicle into which the inductive-recharging device 1 is incorporated. This is true of all of the embodiments of the present invention.

The recharging device 1 comprises a fixed support 20 bearing the respective axle 21 of each of the two eccentric wheels 6b, 18 and to which the guide finger 7 is secured by one end.

In FIG. 11, the inductive-recharging device 1 may comprise a lower casing 19 collaborating with the removable upper casing 22 to incorporate and protect all of the rest of the device 1 inside them. The upper and lower casings 22, 19 also house between them the motor 5, advantageously an electric motor, and the output shaft 9 of the motor 5. Reduction gearing 5a may be associated with the motor 5.

In the third embodiment, the fixed support 20 may also bear the circular closed guide zone 7b for guiding the second end of the substantially rectilinear guide finger 7 the other end of which has entered a groove formed on a face of the stage 4 facing the support 20. The second end of the guide finger 7 is housed inside the guide zone 7b.

In correspondence with this embodiment, the recharging device 1 according to the first and second embodiments may have such lower and upper casings 19, 22 and such a fixed support 20, the fixed support 20 being specifically tailored to each embodiment.

With reference to the figures specific to these embodiments, for example in the case of the first embodiment, a fixed support may have two rotation axles, for each of the pulleys 10, 12, with, where appropriate, a rotation axle for each tensioning roller 13.

Figure 5:
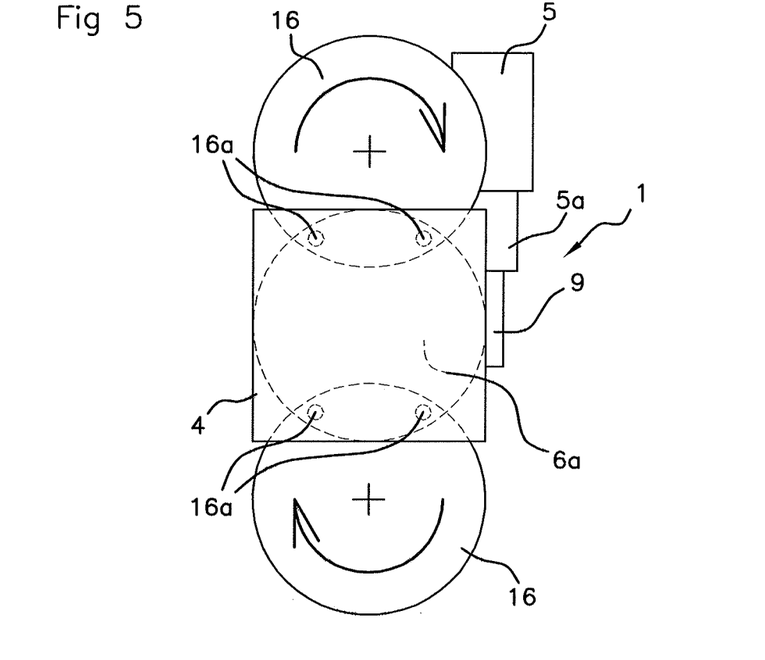
FIG. 5 is a schematic depiction of a view from above of the induction-recharging device according to the second embodiment illustrated in FIG. 4, FIGS. 6A-6I illustrate, viewed from above, various successive steps of the dynamics of the inductive-recharging device illustrated in FIGS. 4 and 5, FIGS. 7A-7H illustrate, viewed in cross section, various successive steps of the dynamics of the inductive-recharging device illustrated in FIGS. 4 and 5.
Figure 6:
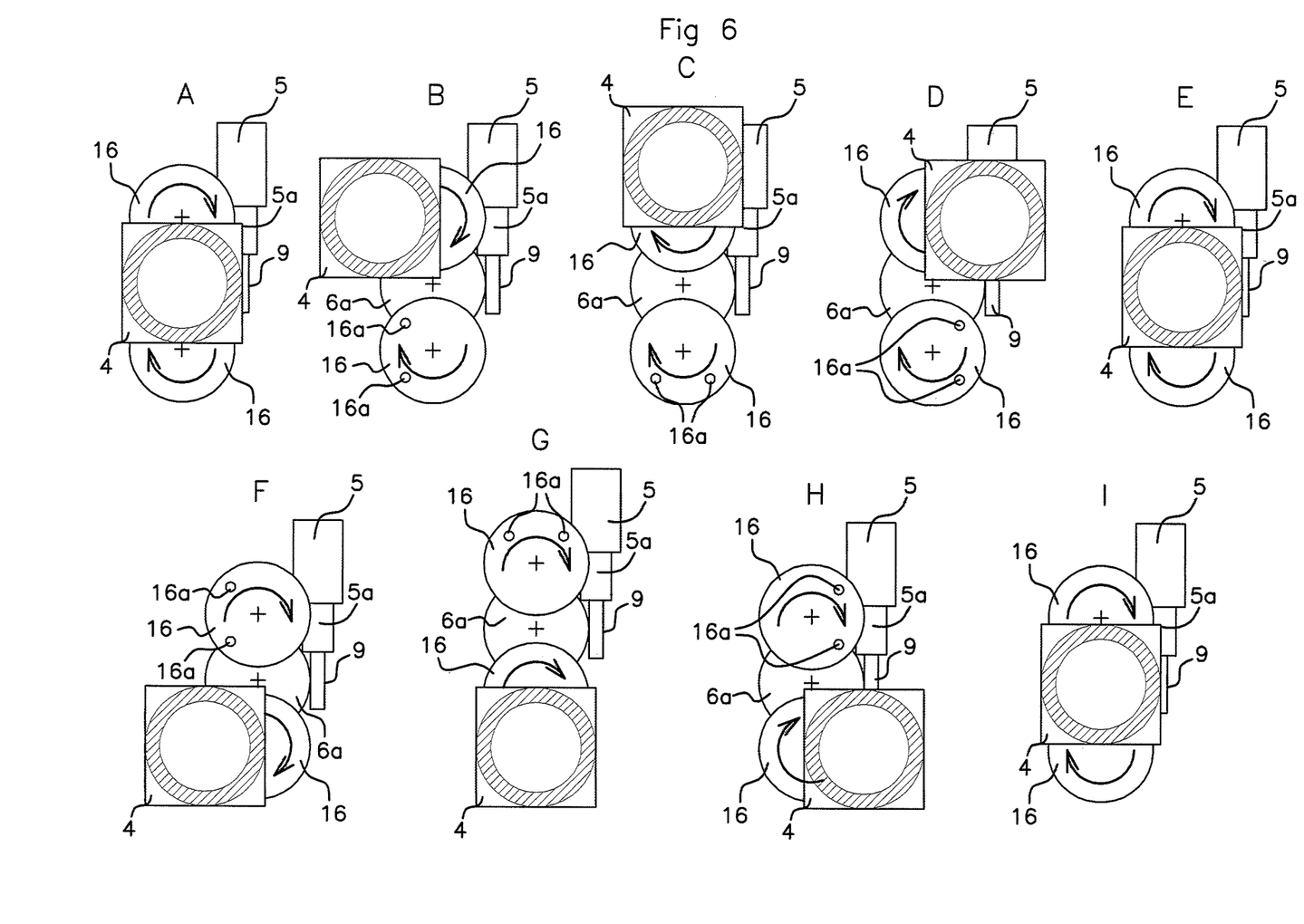

In the case of the second embodiment, a fixed support may have a rotation axle 21 for the main primary meshing element 6a.

Superposed on the actuating mechanism is the mobile stage 4 or antenna support. In FIG. 11, the stage 4 supports two coils, for example Litz wire coils, forming the emitting antennas 3. The upper casing 22 covers all these elements of the actuating mechanism and forms the upper face of the recharging device 1 on which the electronic element 2 that is to be recharged is laid.

For all the embodiments of the present invention, the emitting antenna(s) may be in the form of one or more flat coil(s) resting on a face of the stage 4 that is intended to face one or more receiving antenna(s) belonging to the electronic element 2 that is to be recharged. When there were several antennas, notably coils, these coils may be arranged in a line, in a triangle, or in any other manner that improves the coverage of the charging zone.

The invention claimed is:

1. A device for the inductive recharging of an electronic element of a mobile-phone or digital tablet type having at least one receiving antenna, the device comprising:

an exterior face intended to support the electronic element for the recharging of same, a stage of planar shape being able to move inside the device and bearing at least one emitting antenna intended to be aligned with, and in close proximity to, said at least one receiving antenna, the stage being actuated by a motorized actuating mechanism, the motorized actuating mechanism comprising a single motor coupled to a main drive element that renders the stage mobile in a plane parallel to the exterior face of the device, the main drive element being circular in shape, and the motor meshing with a periphery of the main drive element and driving the main drive element in rotation, the actuating mechanism comprising at least one guide finger pointing toward the stage, said at least one guide finger entering a groove made on one face of the stage facing the actuating mechanism and the motor has reduction gearing and an output shaft meshing with the periphery of the main drive element, the output shaft and the main drive element extending in a plane parallel to the plane of the stage, wherein, in the actuating mechanism, the main drive element is secured to a pulley by way of a driving pulley, arranged coaxially with respect to the main drive element and driven in rotation by the motor via the main drive element, a belt being wrapped around the driving pulley and around at least one driven return pulley, the belt bearing said at least one guide finger.

2. The device as claimed in claim 1, wherein the actuating mechanism comprises at least one tensioning roller for tensioning the belt.

3. The device as claimed in claim 1, wherein the main drive element is a primary meshing element driving two secondary meshing elements positioned diametrically opposite each other with respect to the center of the primary meshing element, said at least one guide finger passing through each secondary meshing element in the direction of the stage, said at least one guide finger being mobile toward and away from the stage by action of a cam profile borne by one face of the primary meshing element oriented toward the stage.

4. The device as claimed in claim 3, wherein said at least one guide finger is elastically returned away from the stage by a return element, the groove f-forming a guideway for said at least one finger.

5. The device as claimed in claim 4, wherein the actuating system comprises two guide fingers per secondary meshing element, each secondary meshing element having a first drive pinion meshing with the periphery of the primary meshing element, and a second pinion facing toward the stage, the first drive pinion and the second pinion being coaxial and secured by a connecting shaft, the first drive pinion, the second pinion, the primary meshing element and the stage extending in respective parallel planes.

6. The device as claimed in claim 5, wherein each second pinion is larger in diameter than the first drive pinion with which it is associated, the second pinion overlapping from a distance a portion of the primary meshing element, the second pinion having passing through it two bores for the passage of a respective guide finger, the two bores together subtending a circular arc of less than.

7. The device as claimed in claim 1, wherein the main element is a driving eccentric wheel, the actuating mechanism also comprising a guide finger and an auxiliary eccentric wheel not directly driven by the motor, the actuating mechanism being configured in such a way that the movement of the stage is a combination of a translational movement and of a rotational movement.

8. The device as claimed in claim 7, further comprising a fixed support supporting the axle of each of the two eccentric wheels and to which fixed support the guide finger is secured by one end, the guide finger being housed in a guide zone with a closed circular edge to limit its travel.

9. The device as claimed in claim 1, wherein said at least one emitting antenna is in the form of a flat coil resting against a face of the stage that is intended to face said at least one receiving antenna of the electronic element that is to be recharged.

10. A motor vehicle, comprising an inductive-recharging device as claimed in claim 1.

* * * * *

UNITED STATES PATENT AND TRADEMARK OFFICE
CERTIFICATE OF CORRECTION

| | |
|---|---|
| PATENT NO. | : 11,108,283 B2 |
| APPLICATION NO. | : 16/341129 |
| DATED | : August 31, 2021 |
| INVENTOR(S) | : Vincent Lubert and Frédéric Ducos |

It is certified that error appears in the above-identified patent and that said Letters Patent is hereby corrected as shown below:

In the Claims

Column 8, In Claim 4, Line 45, "f-forming" should be -- forming --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*